United States Patent
Kim et al.

(10) Patent No.: US 12,430,169 B2
(45) Date of Patent: Sep. 30, 2025

(54) STORAGE SYSTEM WITH IMPROVED QUALITY OF SERVICE

(71) Applicant: SAMSUNG ELECTRONICS CO., LTD., Suwon-si (KR)

(72) Inventors: Byeong Hui Kim, Hwaseong-si (KR); Dong Hyub Kang, Seoul (KR); Hyun Kyo Oh, Yongin-si (KR); Sung Min Jang, Hwaseong-si (KR); Ki Been Jung, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 547 days.

(21) Appl. No.: 17/819,007

(22) Filed: Aug. 11, 2022

(65) Prior Publication Data
US 2023/0161619 A1    May 25, 2023

(30) Foreign Application Priority Data

Nov. 22, 2021    (KR) .................. 10-2021-0161470

(51) Int. Cl.
  *G06F 9/48* (2006.01)
  *G06N 5/022* (2023.01)
(52) U.S. Cl.
  CPC ........... *G06F 9/4881* (2013.01); *G06N 5/022* (2013.01)
(58) Field of Classification Search
  None
  See application file for complete search history.

(56) References Cited

U.S. PATENT DOCUMENTS

| 7,499,908 | B2 | 3/2009 | Elnaffar et al. |
| 7,606,944 | B2 * | 10/2009 | Kalwitz ............... G06F 3/0689 711/158 |
| 8,095,486 | B2 | 1/2012 | Chen et al. |
| 9,619,251 | B2 | 4/2017 | Moen et al. |
| 10,254,970 | B1 | 4/2019 | Martin et al. |

(Continued)

FOREIGN PATENT DOCUMENTS

| KR | 10-2019-0057854 | 5/2019 |
| KR | 10-2021-0026767 | 3/2021 |

(Continued)

OTHER PUBLICATIONS

European Search Report dated Apr. 20, 2023 in corresponding European Patent Application No. 22208620.9 (4 pages).

(Continued)

*Primary Examiner* — Van H Nguyen
(74) *Attorney, Agent, or Firm* — MORGAN, LEWIS & BOCKIUS LLP

(57) ABSTRACT

A storage system may be connected to a machine learning model embedded device that includes a trained simulation model. The simulation model may be trained based on a loss function, where the loss function is based on a comparison of predicted QoS data and real QOS data. The simulation model may be trained to search for a workload for increasing the QoS using a fixed parameter or, conversely, to search for a parameter for maximizing the QoS using a fixed workload. Further, the machine learning model embedded device may include a map table storing the optimized parameters calculated by the trained simulation model so as to maximize QoS relative to each workload.

17 Claims, 8 Drawing Sheets

(56) References Cited

U.S. PATENT DOCUMENTS

| | | | |
|---|---|---|---|
| 10,554,738 B1 | 2/2020 | Ren et al. | |
| 10,642,764 B1 | 5/2020 | Gerhart et al. | |
| 10,748,066 B2 * | 8/2020 | Ravi | G06F 17/16 |
| 10,809,936 B1 | 10/2020 | Kaushik et al. | |
| 10,885,277 B2 * | 1/2021 | Ravi | G06F 40/253 |
| 11,209,998 B2 * | 12/2021 | Bahar | G06F 3/0679 |
| 2013/0031035 A1 * | 1/2013 | Jeanne | H04L 41/0896 |
| | | | 706/12 |
| 2017/0031816 A1 | 2/2017 | Lee et al. | |
| 2020/0142466 A1 | 5/2020 | Naik et al. | |
| 2020/0234159 A1 | 7/2020 | Craig et al. | |
| 2021/0200448 A1 | 7/2021 | Chen et al. | |
| 2021/0287138 A1 * | 9/2021 | Chang | G06F 30/13 |

FOREIGN PATENT DOCUMENTS

| | | |
|---|---|---|
| KR | 10-2021-0031220 | 3/2021 |
| KR | 10-2021-0082345 | 7/2021 |
| KR | 10-2021-0101062 | 8/2021 |
| WO | 2021/113427 | 6/2021 |

OTHER PUBLICATIONS

First Office Action dated May 4, 2023 in corresponding European Patent Application No. 22208620.9 (8 pages).

* cited by examiner

STORAGE SYSTEM WITH IMPROVED QUALITY OF SERVICE

CROSS-REFERENCE TO RELATED APPLICATION

This application claims priority from Korean Patent Application No. 10-2021-0161470 filed on Nov. 22, 2021 in the Korean Intellectual Property Office, and all the benefits accruing therefrom under 35 U.S.C. 119, the contents of which in its entirety are herein incorporated by reference.

BACKGROUND

Field

The present disclosure generally relates to a storage system including a non-volatile memory device.

Description of Related Art

A storage system may include one or more storage devices (e.g., such as solid state drives (SSDs), hard disk drives (HDDs), etc.) for storing information, data, etc. For instance, storage devices of a storage system may be located or configured in one or more racks, chassis, etc. In some examples, data may be transferred between the storage devices and one or more local or remote hosts (e.g., through a storage interface on each host and/or storage device). In some cases, a storage device may be connected to a storage system. A storage system may also include a management component (e.g., such as a controller) which may perform various functions for the storage system (e.g., such as monitoring, configuration, and/or other management functions).

Advances in semiconductor technology provide for storage devices (e.g., such as a SSD devices) being continuously developed toward higher specifications and higher performance. Moreover, software technology is being developed to overcome limitations of underlying hardware technology, and advanced software architectures within storage devices may be complex. For example, software architectures may include numerous variables (e.g., in a module), as well as algorithms responsible for various functions in a storage device. Moreover, optimizing variables (e.g., parameters) for each environment of a storage device may demand high-level design space exploration.

In some aspects, a storage device may satisfy a certain level of requirements, for example, such as Quality of Service (QoS). However, because QoS affects various regions (e.g., including Host Interface Layer (HIL), Flash Translation Layer (FTL), and Flash Interface Layer (FIL)), optimization of a device to meet certain QoS demands may be challenging, time consuming, etc. Further, in some cases, unknown side effects may occur during optimization procedures. For instance, tuning a QoS-related parameter, in a state in which a QoS-related algorithm has been completed, may require a lot of time and cost.

In many cases, QoS parameters may be tuned using experience and intuition of a skilled developer or in a trial-and-error manner to heuristically determine optimized parameters. Because a high-dimensional parameter space may be large (e.g., almost infinite), there is a high probability that a determined parameter is a local value. Further, most parameters may be competing or conflicting with each other. Thus, it may take a long time to find the optimized parameters (e.g., thus, determined parameters may cause undesirable side effects). Accordingly, there is a need in the art for improved QoS parameter optimization techniques.

SUMMARY

One embodiment of the present disclosure provides a storage system comprising a storage device comprising a plurality of non-volatile memory devices and a storage controller configured to access the storage device, and to perform a workload based on a parameter. In some aspects, the parameter is selected by a trained simulation model to increase Quality of Service (QoS) for the workload. In some aspects, the simulation model is configured to: perform a training workload using a training parameter to generate predicted QoS data based on an initial simulation model, wherein the storage controller is also configured to perform the training workload using the training parameter to calculate real QoS data; calculate a loss based on a comparison between the predicted QoS data and the real QoS data; and train the initial simulation model to update the simulation model based on the loss.

Another embodiment of the present disclosure provides a storage system comprising a storage device comprising a plurality of non-volatile memory devices and a storage controller configured to access the storage device, wherein the storage controller comprises: a central processing unit (CPU) for controlling an operation of the storage device, a non-volatile memory device storing a plurality of parameters for the operation and a map table for storing mapping results between the plurality of parameters and each workload for the operation, wherein the plurality of parameter stored in the map table comprises optimized parameters calculated by a trained simulation model to increase QoS for each workload based on a state of the non-volatile memory device, wherein the simulation model is configured to be trained based on a loss calculated based on a real QoS data set and a predicted QoS data set.

Another embodiment of the present disclosure provides a storage system comprising a storage device comprising a plurality of non-volatile memory devices and a storage controller configured to access the storage device, and to perform a workload based on a parameter, wherein the storage controller is configured to store a plurality of workloads and a plurality of parameters, wherein the workload and the parameter comprises optimized data calculated by in a machine-learning based simulation model for increasing QoS, wherein the machine-learning based simulation model is configured to: compare predicted QoS data and real QoS data to obtain a loss, wherein a previously trained simulation model performs a training workload using a training parameter to calculate the predicted QoS data and update the previously trained simulation model to an updated simulation model, wherein a loss of the updated simulation model is smaller than a loss of the previously trained simulation model.

Another embodiment of the present disclosure provides a method comprising: training a simulation model based on a loss between predicted QoS data and real QoS data, wherein the predicted QoS data is obtained using the simulation model and the real QoS data is obtained using a storage controller; identifying a workload to be performed by the storage controller; selecting an optimized parameter using the trained simulation model to increase a QoS for the workload; and performing, using the storage controller, the workload based on the optimized parameter.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

BRIEF DESCRIPTION OF DRAWINGS

The above and other aspects and features of the present disclosure will become more apparent by describing in detail exemplary embodiments thereof with reference to the attached drawings.

DETAILED DESCRIPTIONS

Figure 1:
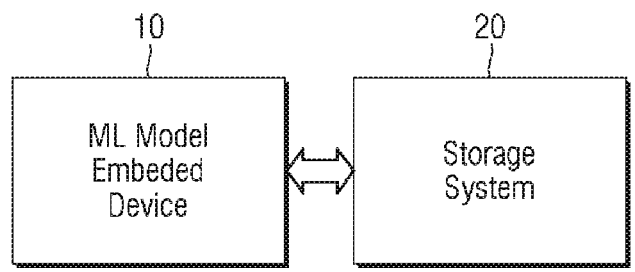
FIG. 1 is a block diagram showing a machine learning storage system according to one or more embodiments of the present disclosure.

In some aspects, a storage device may be designed or configured to satisfy certain performance requirements, for example, such as Quality of Service (QoS) requirements. Generally, QoS may include, or be measured by, throughput information, input/output operations per second (IOPS), and latency information (e.g., average latency, percentile latency, etc.), among other examples. In order to achieve certain performance (e.g., QoS) standards, storage devices may perform (or handle) workloads based on various parameters (e.g., set parameters affecting the operation of the storage system, such as delay time for input/output (I/O), a delay time based on the number of write caches in use, a write amplification factor (WAF) threshold parameter for adding an additional delay time when the WAF deteriorates to a value beyond a preset threshold, etc.). However, because QoS may be impacted by various regions of a storage device (e.g., including Host Interface Layer (HIL), Flash Translation Layer (FTL), and Flash Interface Layer (FIL)), optimization of a storage device to meet certain QoS demands may be challenging, time consuming, etc.

Artificial intelligence techniques such as machine learning may include or refer to learning techniques in which a model for data analysis is automatically created such that software learns data and finds a pattern. One or more aspects of the present disclosure provide a storage controller and a storage system which generate a QoS simulation model via machine learning to detect an optimized parameter and an optimized workload, for example, such that operation based on the optimized parameter or the optimized workload increases (e.g., maximizes) the QoS.

For instance, a storage system (e.g., a storage device, a storage controller, etc.) may be connected to a machine learning model embedded device that includes a trained simulation model. The simulation model may be trained based on a loss function, where the loss function is based on a comparison of predicted QoS data and real QoS data. For example, the simulation model may be trained to search for a workload for increasing (e.g., maximizing) the QoS using a fixed parameter or, conversely, to search for a parameter for maximizing the QoS using a fixed workload. Further, the machine learning model embedded device may include a map table storing the optimized parameters calculated by the trained simulation model so as to maximize QoS relative to each workload. Accordingly, a storage controller may be configured to access a storage device and perform workloads based on optimized parameters selected by the trained simulation model (e.g., such that QoS relative to each workload is maximized based on optimized parameters selected for each workload).

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating an embodiments of the present disclosure are exemplary, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of at least one of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may actually be executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated. The features of the various embodiments of the present disclosure may be partially or entirely combined with each other, and may be technically associated with each other or operate with each other. The embodiments may be implemented independently of each other and may be implemented together in an association relationship.

One or more aspects of an example storage system according to some embodiments of the present disclosure is described with reference to FIGS. 1 through 15.

FIG. 1 is a block diagram showing a machine learning storage system according to some embodiments.

Referring to FIG. 1, a machine learning storage system according to some embodiments may include a machine learning model embedded device 10 (e.g., hereinafter, ML model embedded device 10) and a storage system 20.

The ML model embedded device 10 according to some embodiments may include a pre-trained initial simulation model. For example, the ML model embedded device 10 includes a processor and a memory. The pre-trained initial simulation model is stored in the memory. The processor may perform machine learning on learning target data using the pre-trained initial simulation model and then predict learned output data using the trained simulation model. The processor may calculate a loss based on a comparing result between the predicted output data and real output data and may train the simulation model based on the loss. The processor may calculate predicted output data corresponding to a subsequent input data using the trained simulation model.

The ML model embedded device 10 according to some embodiments may be embodied as (e.g., may include) an embedded board and may be electrically connected to the storage system 20 and the ML model embedded device 10 may receive data from the storage system 20. In some examples, the ML model embedded device 10 may calculate the predicted output data corresponding to the received data using the simulation model (e.g., as described in more detail herein).

In some cases, ML model embedded device 10 is a microprocessor that specializes in the acceleration of machine learning algorithms. For example, ML model embedded device 10 may operate on predictive models such as artificial neural networks (ANNs) or random forests (RFs), etc. In some cases, a ML model embedded device 10 is designed in a way that makes it unsuitable for general purpose computing such as that performed by a Central Processing Unit (CPU). Additionally or alternatively, in some cases, the software support for a ML model embedded device 10 may not be developed for general purpose computing. In some cases, ML model embedded device 10 may include or be referred to as a neural processing unit (NPU), a neural network, a machine learning processor, etc.

The ML model embedded device 10 according to some embodiments may act as a test device for testing the storage system 20. Alternatively, the ML model embedded device 10 according to some embodiments may act as a server device that manages the storage system 20. Alternatively, the ML model embedded device 10 according to some embodiments may be embodied as a device implemented in the storage system 20 or as a device implemented separately from the storage system 20 and implemented in one semiconductor device.

In some aspects, the storage system 20 may include storage media for storing data in response to a request from a host device. In an example, the storage system 20 may include a storage controller 200 and a storage device 400. The storage device 400 may include at least one of an Solid State Drive (SSD), an embedded memory, and a removable external memory. When the storage device 400 is embodied as the SSD, the storage device 400 may be embodied as a device complying to a non-volatile memory express (NVMe) standard. When the storage device 400 is embodied as the embedded memory or the external memory, the storage device 400 may be embodied as a device complying to an universal flash storage (UFS) or embedded multimedia card (eMMC) standard. In some examples, each of a host device and the storage device 400 may generate a packet according to an adopted standard protocol and transmit the same. The storage system 20 will be described later in FIGS. 13 through 15.

When the storage device 400 of the storage system 20 includes a flash memory, the flash memory may include a 2D NAND memory array or a 3D (e.g., or vertical) NAND (VNAND) memory array. In another example, the storage device 400 may include various other types of non-volatile memories. For example, the storage device 400 may include Magnetic RAM (MRAM), Spin-Transfer Torque MRAM, Conductive bridging RAM (CBRAM), Ferroelectric RAM (FeRAM), Phase RAM (PRAM), Resistive memory (Resistive RAM), and other various types of memories.

Figure 2:
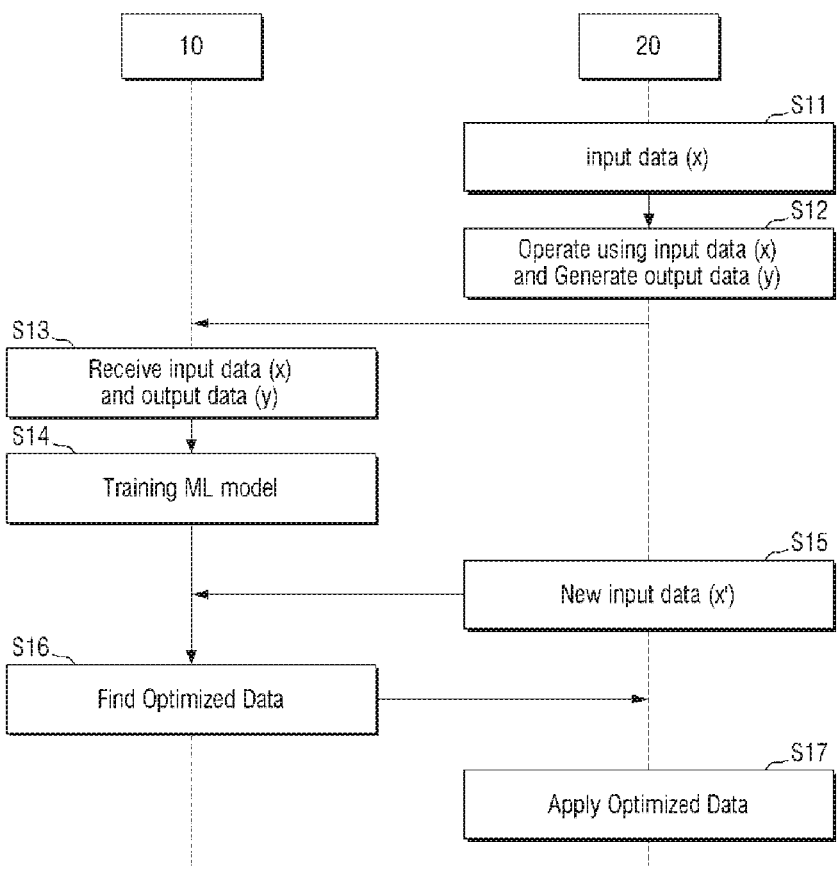
FIG. 2 shows a method for operating a machine learning storage system according to one or more embodiments of the present disclosure.
Figure 3:
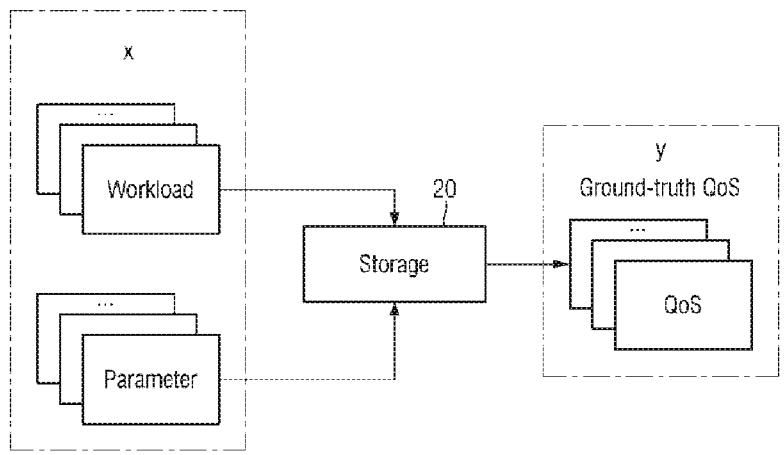
FIG. 3 is a diagram for illustrating an operation of collecting a training data set in a storage system according to one or more embodiments of the present disclosure.

FIG. 2 shows a method for operating a machine learning storage system according to some embodiments. FIG. 3 is a diagram for illustrating an operation of collecting a training data set in a storage system according to some embodiments.

Referring to FIG. 2, when an input data set X is input to the storage system 20 in S11, the storage system 20 performs an operation on the input data to generate a training data set, and thus generates an output data set Y in S12. In this connection, data set refers to a set including a plurality of data.

More specifically, according to some embodiments, the input data set X may include a workload data set and a parameter data set related to an operation of the storage system 20.

The workload data set according to some embodiments may be an input/output pattern requested from the host device to the storage system 20. In an example, the workload data set may include a read ratio, a write ratio, a queue depth, a I/O chunk size, a I/O interval, etc. For example, it may be assumed that the workload data includes write only data, read only data, and mix data (Write/Read). The write only data, the read only data, and the mix data (Write/Read) may have different queue depths. As the queue depth is larger, the host device may transmit I/O as much as the queue depth to the storage device and wait for a response thereto.

The parameter data set according to some embodiments may include preset parameters affecting the operation of the storage system 20.

According to some embodiments, the workload data set may be input to the storage system 20 using an I/O tool, and the parameter data set may be input to the storage system 20 using a Vendor Unique Command (VUC). The output data set Y according to some embodiments may refer to information observed in the storage system 20 when the input data set X is input to the storage system 20. For example, the output data set Y may be QoS information. The QoS information according to some embodiments may include throughput, IOPS, latency, and the like.

Because different output data may be observed for different input data applied to the storage system 20, the training input data set may include a large number of input data having various distributions. As the number (e.g., amount) of data of the training input data set is larger, prediction accuracy of the simulation model may be higher.

Referring to FIG. 2 and FIG. 3, when the storage system 20 according to some embodiments receives the training input data set X including a training workload data set WORKLOAD and a training parameter data set PARAMETER in S11, the storage system 20 may generate a real output data set Y corresponding to each of the training input data in S12. For example, the real output data set Y may include a real QoS data set Ground-truth QoS.

The ML model embedded device 10 receives the training input data set X and the real output data set Y in S13. The training data set may be, for example, the input data set X including the training workload data set WORKLOAD and a training parameter data set PARAMETER. The real output data set Y may be the real QoS data set Y corresponding to each of the training input data.

The ML model embedded device 10 trains a machine learning model, for example, a simulation model using the training data set in S14. According to some embodiments, a format of the training data set may be converted to a format appropriate for training the model.

In some aspects, at S14, a simulation model may be trained based on a loss between predicted QoS data and real QoS data, wherein the predicted QoS data is obtained using the simulation model and the real QoS data is obtained using a storage controller. For instance, an initial simulation model may perform a training workload using a training parameter to generate predicted QoS data. The storage controller may also be configured to perform the training workload using the training parameter to calculate real QoS data. The training in S14 will be described later with reference to FIG. 4.

When new input data X' of the storage system 20 is received by the ML model embedded device 10 in S15, the device 10 searches for optimized data based on the trained simulation model in S16. In some aspects, S15 may include identifying a workload to be performed by the storage system 20 (e.g., identifying a workload to be performed by a storage controller).

At S16, an optimized parameter may be selected using the trained simulation model to increase a QoS for the workload. In some aspects, the storage system 20 (e.g., the storage controller) may include a non-volatile memory device, and the optimized parameter may be selected in operation S16 based at least in part on a state of the non-volatile memory device). The trained simulation model may select a parameter having an increased QoS (e.g., an expected maximum QoS) related to the new input data X' from those trained to be closer to the real QoS data. In an example, the new input data X' may be one of features of a workload to be performed in the storage system 20, and the optimized data may be an optimized parameter for increasing (e.g., maximizing) the QoS data. In another example, the new input data X' may be a parameter set in the storage system 20, and the optimized data may be an optimized workload path that increases (e.g., maximizes) the QoS data.

The storage system 20 may apply the optimized data selected as a result of the search operation in S17. That is, the storage system 20 performs overall operations in an environment to which the optimized data is applied. In some aspects, S17 may include the storage system 20 performing (e.g., using the storage controller) the workload based on the optimized parameter (e.g., the optimized parameter selected in operation S16).

Figure 4:
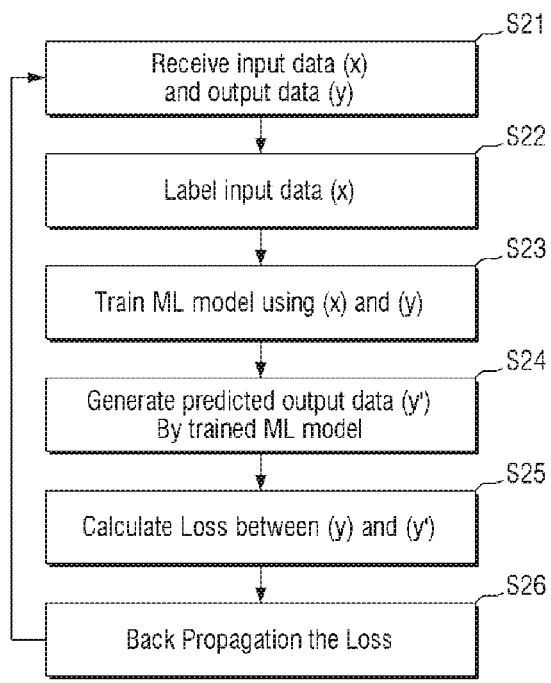
FIG. 4 is a flowchart for illustrating a method for training a simulation model according to one or more embodiments of the present disclosure.
Figure 5:
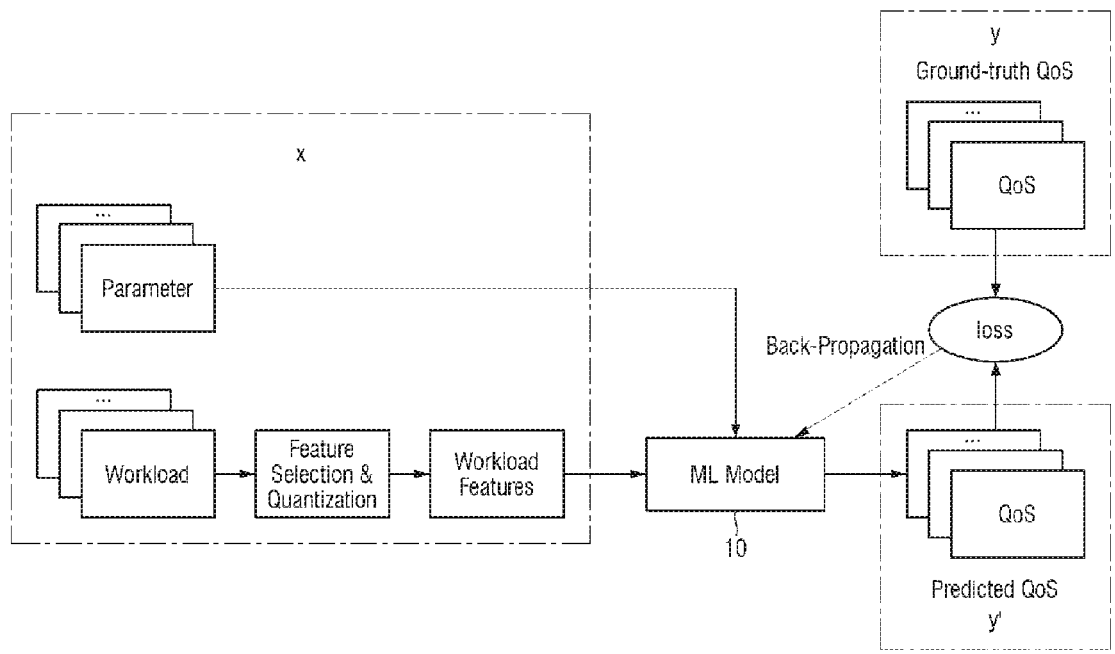
FIG. 5 is a diagram for illustrating a method for training a simulation model according to one or more embodiments of the present disclosure.

FIG. 4 is a flowchart for illustrating a method for training a simulation model according to some embodiments. FIG. 5 is a diagram for illustrating a method for training a simulation model according to some embodiments.

Referring to FIG. 4 and FIG. 5, the ML model embedded device 10 receives a training data set X and Y in S21. The training data set as a mapping result of the input data set X and the output data set Y may be provided to the ML model embedded device 10. For example, the training data set X and Y may be a data set in which the parameter, the workload, and the QoS information are mapped to each other.

For instance, ML model embedded device 10 may include or implement machine learning techniques, a neural network, etc. As one example, an artificial neural network is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the maximum from the inputs as the output) or any other suitable algorithm for activating the node. Each node and edge is associated with one or more node weights that determine how the signal is processed and transmitted.

During the training process, these weights are adjusted to improve the accuracy of the result (i.e., by reducing or minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, the ML model embedded device 10 may label the input data set X based on data features in S22. For example, when the input data set is the workload data set, the ML model embedded device 10 may identify features of each workload data, and select/classify the workload data based on the features, and perform quantization of the selected/classified data, etc. In this way, the labeling may be performed based on the classified features. In an example, the training data set may be classified based on the labeled workload. In another example, the training data set may be maintained only in the mapped state while not being classified regardless of the labeled workload. Alternatively, according to some embodiments, the ML model embedded device 10 may not perform the labeling but may receive the input data set X specified as having a preset feature and use the same for training the model.

According to some embodiments, the ML model embedded device 10 may train the simulation model using the training data set X and Y. For example, under supervised learning, the device 10 may train the simulation model based on the features of the data set. In an example, the training parameter data may be applied to a preset initial simulation model 10 to perform an operation based on a training workload to generate predicted QoS data Y'. The initial simulation model 10 calculates a loss based on a comparing result of the predicted QoS data Y' with the real QoS data Y. The ML model embedded device 10 may apply the calculated loss to the initial simulation model to update the simulation model.

In another example, the simulation model may be trained using semi-supervised learning obtained by mixing supervised learning and unsupervised learning with each other. For example, the parameter data sets and/or the workload data sets may be clustered based on the mapped QoS data sets, and features thereof may be found, and the training data sets may be labeled based on the features. Afterwards, the preset initial simulation model 10 may perform an operation based on the labeled training data X to generate the predicted QoS data Y'. The initial simulation model 10 calculates a loss based on a comparing result of the predicted QoS data Y' with the real QoS data Y.

A "loss function" may refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

The ML model embedded device 10 may apply the calculated loss to the initial simulation model to train the simulation model. For example, the training of the simulation model is intended to select input data (e.g., an optimized input data), a workload (e.g., an optimized workload) or a parameter (e.g., an optimized parameter) that increases (e.g., maximizes) the QoS based on a following Equation 1.

$$QoS^* = \underset{p^{new}{}_i \in P, w^{new}{}_i \in W}{\operatorname{argmax}} f(p^{new}{}_i, w^{new}{}_i) \qquad \text{Equation 1}$$

In the above Equation 1, QoS denotes a QoS value, p denotes a parameter, P denotes a parameter data set, w denotes a workload, W denotes a workload set, and i denotes a parameter index. For instance, the model may be trained to perform the workload w using the parameter data p to increase (e.g., maximize) the QoS. In other words, the simulation model may be trained so that the predicted QoS data Y' is closer to the real QoS data Y, that is, the loss between the predicted QoS data and the real QoS data is small. Therefore, the model may be updated to a simulation model (e.g., an updated model, a trained model, etc.) for a next step.

Figure 6:
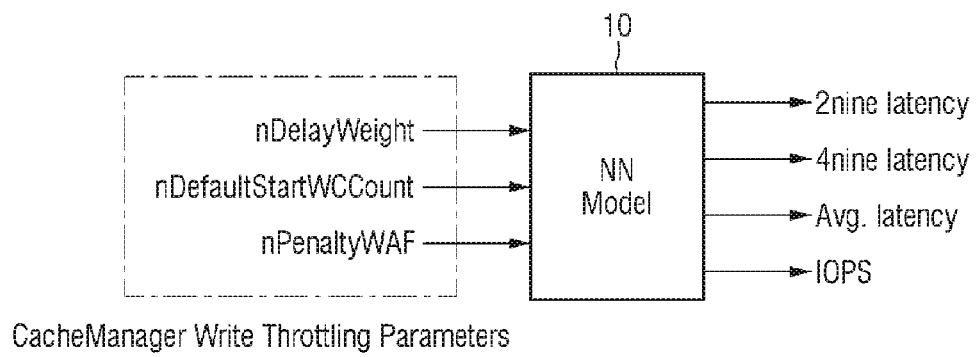
FIG. 6 is a diagram for illustrating a data set of a simulation model according to one or more embodiments of the present disclosure.
Figure 7:
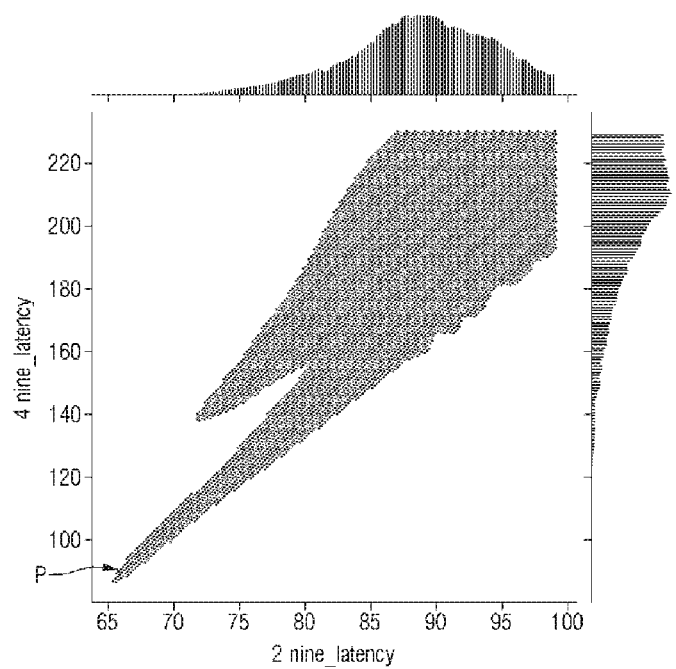
FIG. 7 is a diagram for illustrating an operation of training a simulation model according to one or more aspects of FIG. 6.

FIG. 6 is a diagram for illustrating a data set of a simulation model according to some embodiments, and FIG. 7 is a diagram for illustrating an operation of training a simulation model according to the embodiment of FIG. 6.

It is assumed that an optimized parameter that increases (e.g., maximizes) QoS for a write operation of the storage system 20 is found using the machine learning trained simulation model. In one example, referring to FIG. 6, the parameter data among the input data includes nDelayWeight, nDefaultStartWCCount, and nPenaltyWAF. The workload data among the input data indicates a write operation (write Throttling). The nDelayWeight is a parameter that adds a default delay time for input/output (I/O), and the nDefaultStartWCCount is a parameter that adds a delay time based on the number of write caches in use. The nPenaltyWAF is a WAF threshold parameter for adding an additional delay time when the WAF deteriorates to a value beyond a preset threshold. In this connection, in the present disclosure, the name of each parameter is selected as an example of one embodiment. The name may vary according to various embodiments. For instance, one or more aspects of the described techniques may be applicable to other parameters by analogy, without departing from the scope of the present disclosure.

Any percentile latency (e.g., such as 2nine latency (two 9 percentile latency) or latency in the upper $99^{th}$ percentiles of latency standard, 4nine latency (four 9 percentile latency) or latency in the upper $99.99^{th}$ percentiles of latency standard), Avg.latency, and IOPS are examples showing information about performance, that is, QoS data of the storage system 20 according to some embodiments.

That is, when the parameters [nDelayWeight, nDefaultStartWCCount, nPenaltyWAF] and the workload [write Throttling] as the training data are applied to the simulation model NN Model in an example as shown, the simulation model may calculate a value of each of the predicted QoS data [2nine latency, 4nine latency, Avg.latency, IOPS] to be observed in the storage system 20. The simulation model may be trained to select a parameter or a workload that increases (e.g., maximizes) QoS based on a comparing result of the predicted QoS data with the real QoS data.

A graph of FIG. 7 shows the QoS when an operation on the parameter according to the embodiment of FIG. 6 is performed 1 million times to train the simulation model. The simulation model may predict 4nine_latency and 2nine_latency among the data included in the QoS data as a shown graph distribution (e.g., a shaded portion of FIG. 7), based on the training result. The QoS is better as the latency has a reduced (e.g., minimum) value. Thus, the simulation model may be trained to find a point P where both 4nine_latency and 2nine_latency is reduced (e.g., minimized). Thus, the optimized simulation model may be established. Then, a parameter applied to the point P found in the optimized simulation model may be selected as the optimized parameter.

Figure 8:
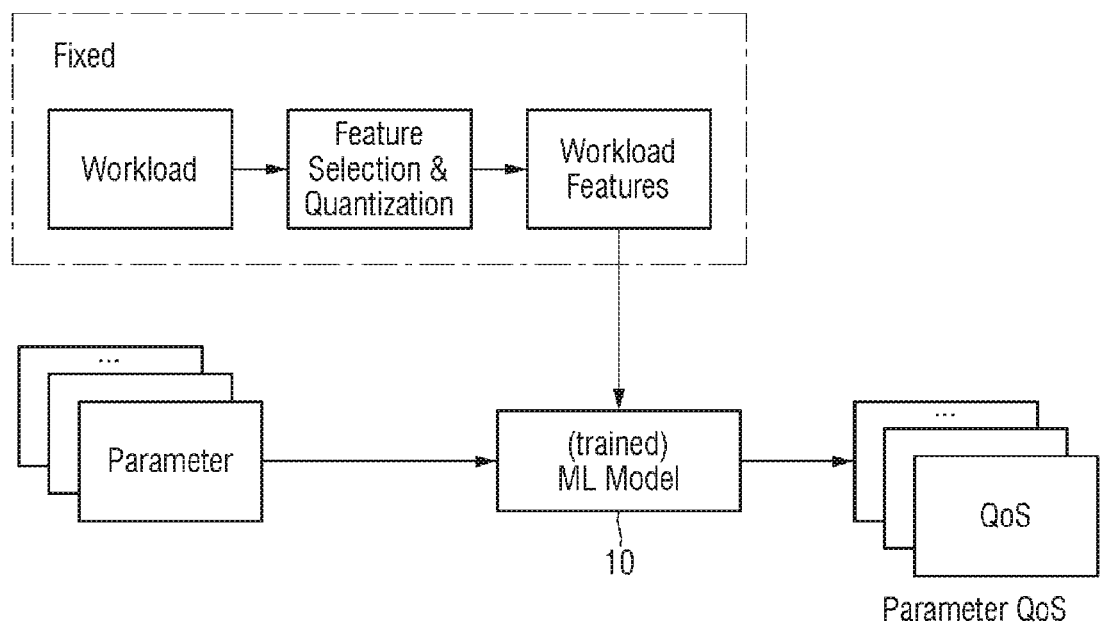
FIG. 8 and FIG. 9 are diagrams for illustrating a method of training a simulation model according to one or more embodiments of the present disclosure.
Figure 9:
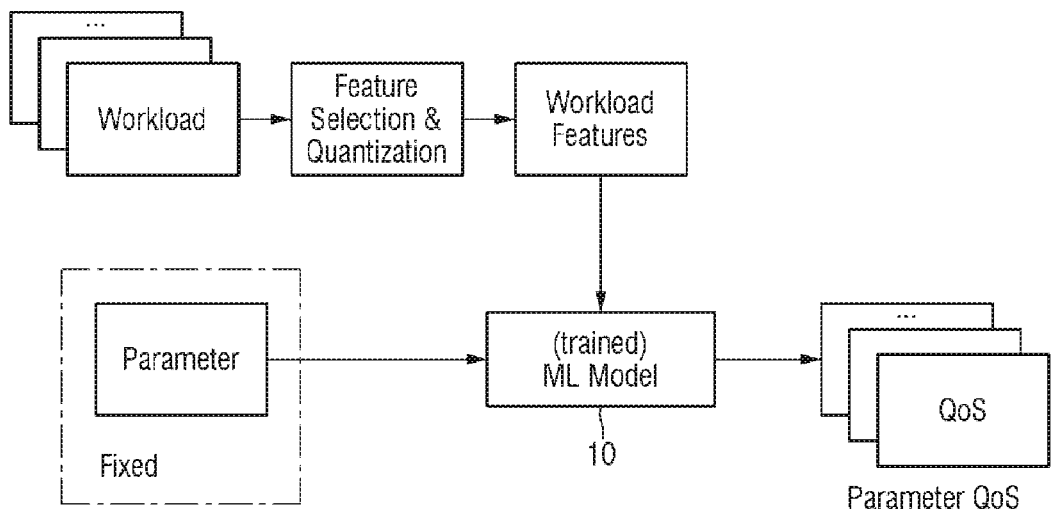

FIG. 8 and FIG. 9 are diagrams for illustrating a method of training a simulation model according to some embodiments.

Referring to FIG. 8, when the ML model embedded device 10 trains the simulation model, the device 10 may fix a predefined workload in the workload data set, and apply the parameter data set to the model, that is, may allow the model to perform a fixed workload relative to each of a plurality of parameters belonging to the parameter data set to calculate the QoS. In this case, the simulation model may more quickly search for the optimized parameter corresponding to the increased (e.g., maximized) QoS relative to the fixed workload.

Referring to FIG. 9, when the ML model embedded device 10 trains the simulation model, the device 10 may fix a predefined parameter in the parameter data set, and apply the workload set to the model, that is, may allow the model to individually perform each of a plurality of workloads belonging to the workload data set to calculate the QoS. In this case, the simulation model may more quickly search for the optimized workload corresponding to the increased (e.g., maximized) QoS relative to the fixed parameters. For example, in a storage system where a user frequently uses a specific workload, when the optimized parameter is found and applied using the simulation model in FIG. 9, the user may use the storage system at an improved performance level.

Figure 10:
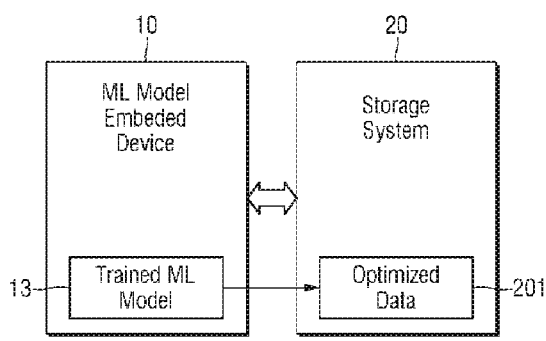
FIG. 10, FIG. 11, and FIG. 12 show machine learning storage systems according to one or more embodiments of the present disclosure.

FIG. 10 show machine learning storage systems according to some embodiments.

Referring to FIG. 10, the ML model embedded device 10 of the machine learning storage system according to some embodiments includes a simulation model 13. The storage system 20 may be a system to which the optimized data found in the trained simulation model 13 is applied. According to some embodiments, the optimized data may be an optimized parameter mapped to a workload, or an optimized workload mapped to a parameter and may be at least one data set.

Figure 11:
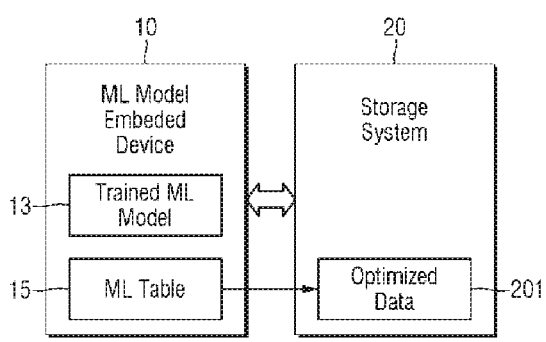

Referring to FIG. 11, the ML model embedded device 10 of the machine learning storage system according to some embodiments includes the simulation model 13 and a machine learning table 15 in which the optimized data generated by the simulation model 13 are mapped to each other. The storage system 20 may be a system to which the optimized data selected from the machine learning table 15 based on features of the storage system is applied.

Figure 12:
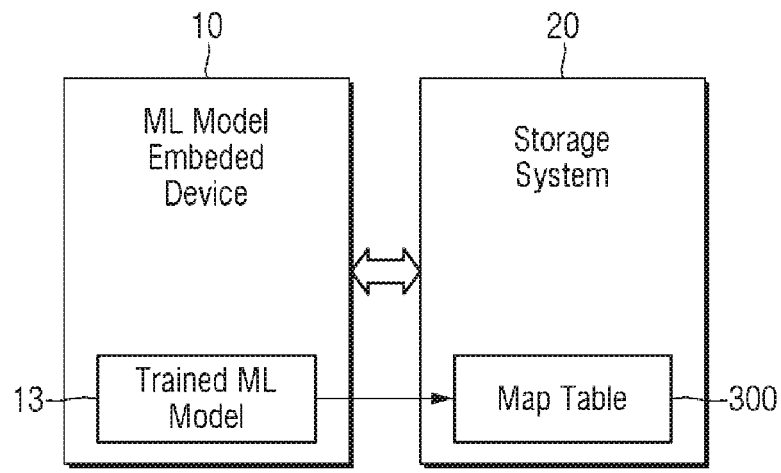

Referring to FIG. 12, the ML model embedded device 10 of the machine learning storage system according to some embodiments includes the simulation model 13. The storage system 20 may include a map table 300 in which the optimized data generated by the simulation model 13 are mapped to each other. That is, the map table 300 may store therein an optimized parameter mapped to each workload to have increased QoS (e.g., the maximum QoS) as calculated by the trained simulation model.

In an embodiment, the storage system 20 may select and apply the optimized parameter or the optimized workload from the map table 300 based on device features or usage features of the storage system. In an embodiment, the storage system 20 may select and apply the optimized parameter or the optimized workload from the map table 300 based on a deterioration amount of the storage system 20.

Although not shown, the map table 300 may store therein a parameter set relative to each workload as optimized based on each of the features of a non-volatile memory device included in the storage device. For example, for the same workload, a map table of the first non-volatile memory device may be different from a map table of the second non-volatile memory device.

Figure 13:
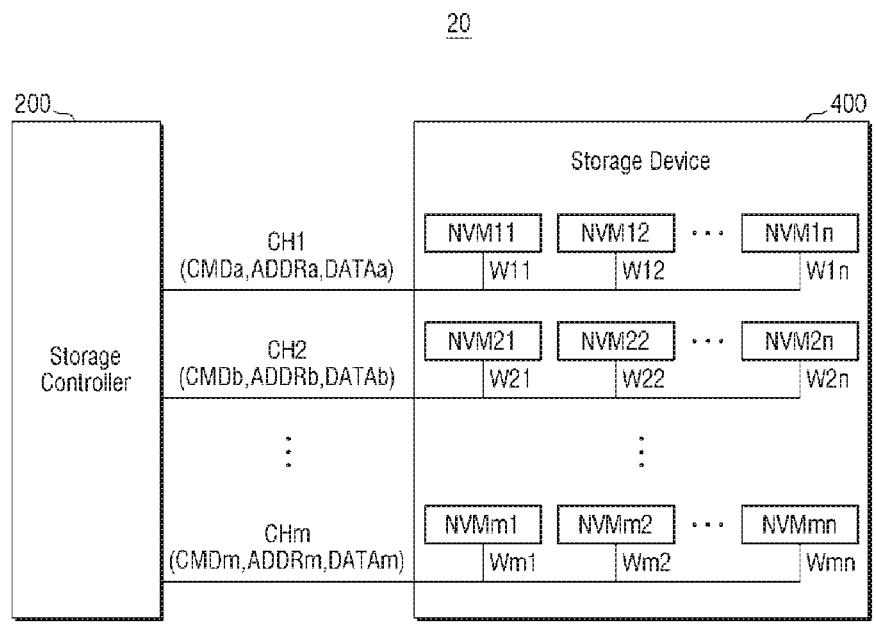
FIG. 13 is a block diagram illustrating a storage system according to one or more embodiments of the present disclosure.

FIG. 13 is a block diagram illustrating the storage system 20 according to some embodiments.

Referring to FIG. 13, the storage system 20 may include a storage device 400 and a storage controller 200. The storage system 20 may support a plurality of channels CH1 to CHm, and the storage device 400 and the storage controller 200 may be connected to each other via a plurality of channels CH1 to CHm. For example, the storage system 20 may be implemented to have a storage device such as an SSD.

The storage device 400 may include a plurality of non-volatile memory devices NVM11 to NVMmn. Each of the non-volatile memory devices NVM11 to NVMmn may be connected to one of the plurality of channels CH1 to CHm via a corresponding way. For example, the non-volatile memory devices NVM11 to NVM1$n$ may be connected to the first channel CH1 via ways W11 to W1$n$, and the non-volatile memory devices NVM21 to NVM2$n$ may be connected to the second channel CH2 via ways W21 to W2$n$. In some embodiments, each of the non-volatile memory devices NVM11 to NVMmn may be implemented as an arbitrary memory unit capable of operating according to an individual command from the storage controller 200. For example, each of the non-volatile memory devices NVM11 to NVMmn may be implemented as a chip or a die. However, the present disclosure is not limited thereto.

The storage controller 200 may transmit/receive signals to and from the storage device 400 via the plurality of channels CH1 to CHm. For example, the storage controller 200 may transmit commands CMDa to CMDm, addresses ADDRa to ADDRm, and data DATAa to DATAm to the storage device 400 via the channels CH1 to CHm, or may receive the data DATAa to DATAm from the storage device 400 via the channels CH1 to CHm.

The storage controller 200 may select one of the non-volatile memory devices connected to each channel via each channel, and may transmit and receive signals to and from the selected non-volatile memory device. For example, the storage controller 200 may select the non-volatile memory device NVM11 from among the non-volatile memory devices NVM11 to NVM1$n$ connected to the first channel CH1. The storage controller 200 may transmit the command CMDa, the address ADDRa, and the data DATAa to the selected non-volatile memory device NVM11 via the first channel CH1, or may receive the data DATAa from the selected non-volatile memory device NVM11 via the first channel CH1.

The storage controller 200 may transmit/receive signals to and from the storage device 400 in a parallel manner via different channels. For example, the storage controller 200 may transmit the command CMDb to the storage device 400 via the second channel CH2 while transmitting the command CMDa to the storage device 400 via the first channel CH1. For example, the storage controller 200 may receive the data DATAb from the storage device 400 via the second channel CH2 while receiving the data DATAa from the storage device 400 via the first channel CH1.

The storage controller 200 may control overall operations of the storage device 400. The storage controller 200 may transmit a signal to the channels CH1 to CHm to control each of the non-volatile memory devices NVM11 to NVMmn connected to the channels CH1 to CHm. For example, the storage controller 200 may transmit the command CMDa and the address ADDRa to the first channel CH1 to control a selected one of the non-volatile memory devices NVM11 to NVM1n. For example, the storage controller 200 may control each non-volatile memory device using an operation parameter selected based on the simulation model as described in FIGS. 1 through 12 trained for each non-volatile memory device.

Each of the non-volatile memory devices NVM11 to NVMmn may operate under control of the storage controller 200. For example, the non-volatile memory device NVM11 may program the data DATAa based on the command CMDa, the address ADDRa, and the data DATAa provided to the first channel CH1. For example, the non-volatile memory device NVM21 may read the data DATAb based on the command CMDb and the address ADDRb provided to the second channel CH2 and may transmit the read data DATAb to the storage controller 200.

In FIG. 13, an example in which the storage device 400 communicates with the storage controller 200 via m channels, and the storage device 400 includes n non-volatile memory devices corresponding to each channel is illustrated. However, the number of the channels and the number of the non-volatile memory devices connected to one channel may be variously changed.

Figure 14:
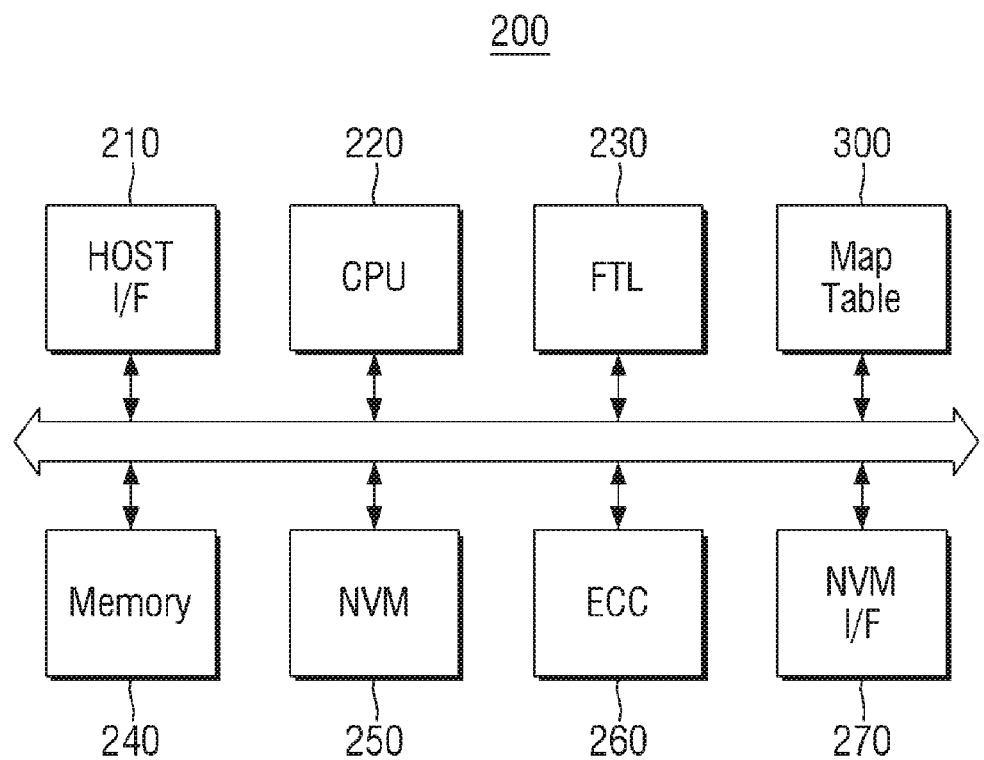
FIG. 14 is a block diagram showing one or more aspects of the storage controller of FIG. 14 according to one or more embodiments of the present disclosure.

FIG. 14 is a block diagram showing the storage controller of FIG. 14 according to some embodiments.

Referring to FIG. 14, the storage controller 200 may include a host interface 210, a memory interface 270 and a CPU 220. Further, the storage controller 200 may further include a Flash Translation Layer (FTL) 230, a buffer memory 240, and an error correction code (ECC) engine 260. In some aspects, the storage controller 200 may further include a working memory into which the FTL 230 is loaded. The CPU 220 may execute the flash conversion layer to control write-in and read-out of data to and from the non-volatile memory.

A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

In some cases, the host interface 210 may transmit/receive packets to/from a host. In some examples, a packet transmitted from a host to the host interface 210 may include a command or data to be written to the non-volatile memory 400. In some aspects, the packet transmitted from the host interface 210 to the host may include a response to the command or the data read from the non-volatile memory 400.

The flash translation layer 230 may perform several functions such as address mapping, wear-leveling, and garbage collection. The address mapping operation may refer to an operation of converting a logical address received from the host device into a physical address used to actually store data in the non-volatile memory 400. The wear-leveling may refer to a scheme to ensure that blocks in the non-volatile memory 400 are used uniformly to prevent excessive degradation of a specific block. The garbage collection may refer to a scheme of copying valid data of a block to a new block and then erasing the former block to secure available capacity in the non-volatile memory 400.

Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

The memory 240 may be a buffer memory and may be an operation memory of the storage controller 200. According to some embodiments, the memory 240 may be a volatile memory, RAM, or the like.

The non-volatile memory 250 may store data necessary for the operation of the storage system 20. For example, the data necessary for the operation of the storage system 20 may include commands and parameters. According to some embodiments, the non-volatile memory 250 may store the optimized data as described in FIGS. 1 to 12.

The ECC engine 260 may perform an error detection and correction function on read-out data read from the non-volatile memory 400. For example, the ECC engine 260 may generate parity bits for to-be-written data to be written into the non-volatile memory 400. The generated parity bits together with the to-be-written data may be stored in the non-volatile memory 400. When reading data from the non-volatile memory 400, the ECC engine 260 may use the parity bits read from the non-volatile memory 400 together with the read-out data to correct an error of the read-out data and output the corrected read-out data.

The NVM interface 270 may transmit data to be written to the non-volatile memory 400 to the non-volatile memory 400 or receive data read from the non-volatile memory 400 therefrom. This NVM interface 270 may be implemented to comply with standard protocols such as Toggle or ONFI.

According to some embodiments, the storage controller 200 may further include the map table 300. The map table 300 may be a data table storing therein a mapping result of the optimized data generated by the simulation model 13 according to the embodiment as described in FIG. 12. According to some embodiments, the map table 300 may include mapping data for each of the non-volatile memory devices 400 as described in FIG. 13.

Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

Figure 15:
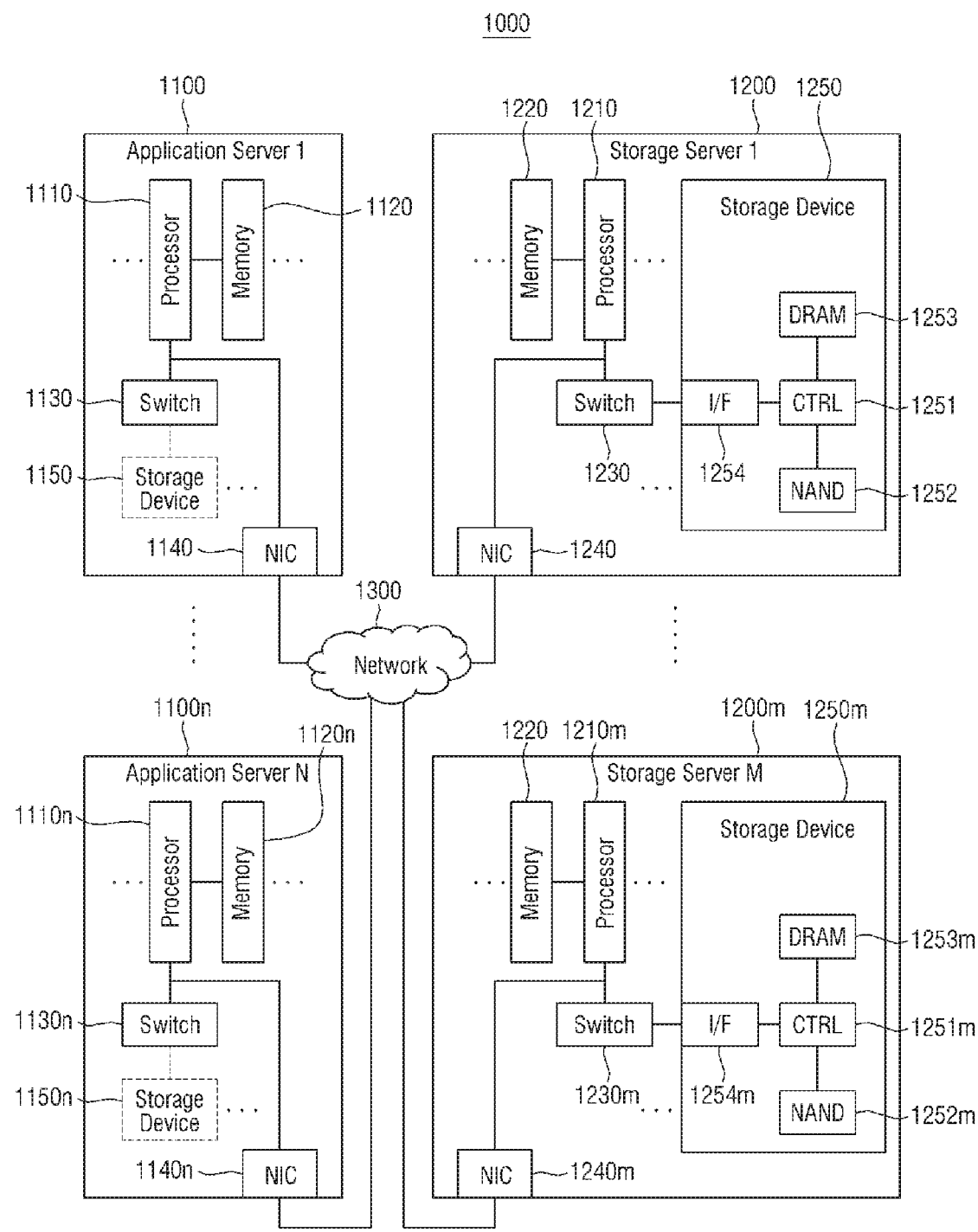
FIG. 15 is a view showing a data center to which a storage system according to one or more embodiments is applied.

FIG. 15 is a view showing a data center to which a storage system according to some embodiments is applied.

Referring to FIG. 15, the data center 1000 may be a facility that collects various data and provides services, and may be referred to as a data storage center. The data center 1000 may be a system for operating a search engine and database, or may be a computing system used in a business such as a bank or a government institution. The data center 1000 may include application servers 1100 to 1100n and storage servers 1200 to 1200m. The number of the application servers 1100 to 1100n and the number of the storage servers 1200 to 1200m may be variously selected according to embodiments. The number of the application servers 1100 to 1100n and the number of the storage servers 1200 to 1200m may be different from each other.

The application server 1100 or the storage server 1200 may include at least one of a processor 1110 or 1210, and a memory 1120 or 1220. A configuration of the storage server 1200 will be described by way of example. In this connection, the processor 1210 may control overall operations of the storage server 1200 and may access the memory 1220 to execute instructions and/or data loaded into the memory 1220. The memory 1220 may include Double Data Rate Synchronous DRAM (DDR SDRAM), High Bandwidth Memory (HBM), Hybrid Memory Cube (HMC), Dual In-line Memory Module (DIMM), Optane DIMM, or Non-Volatile DIMM (NVDIMM). According to the embodiment, the number of the processors 1210 and the number of the memories 1220 included in the storage server 1200 may be variously selected. In some embodiments, the processor 1210 and the memory 1220 may provide a processor-memory pair. In some embodiments, the number of the processors 1210 and the number of the memories 1220 may be different from each other. The processor 1210 may include a single core processor or a multi-core processor. In some aspects, the above descriptions of the storage server 1200 may be similarly applied to the application server 1100. According to the embodiment, the application server 1100 may not include a storage device 1150. The storage server 1200 may include at least one storage device 1250. The number of the storage devices 1250 included in the storage server 1200 may be variously selected according to embodiments.

The application servers 1100 to 1100n and the storage servers 1200 to 1200m may communicate with each other over a network 1300. The network 1300 may be implemented using Fiber Channel (FC) or Ethernet. In this connection, FC may be a medium used for relatively high-speed data transmission, and may use an optical switch that provides high performance/high availability. Depending on an access scheme of the network 1300, the storage servers 1200 to 1200m may be embodied as file storage, block storage, or object storage.

In some embodiments, the network 1300 may be embodied as a storage dedicated network such as a Storage Area Network (SAN). For example, the SAN may be an FC-SAN that uses an FC network and is implemented according to a FCP FC Protocol. In another example, the SAN may be an IP-SAN that uses a TCP/IP network and is implemented according to an iSCSI (SCSI over TCP/IP or Internet SCSI) protocol. In another embodiment, the network 1300 may be a general network such as a TCP/IP network. For example, the network 1300 may be implemented according to protocols such as FC over Ethernet (FCoE), Network Attached Storage (NAS), and NVMe over Fabrics (NVMe-oF).

Hereinafter, descriptions will be focused on the application server 1100 and the storage server 1200. The descriptions of the application server 1100 may be equally applied to other application servers 1100n. The descriptions of the storage server 1200 may be equally applied to other storage servers 1200m.

The application server 1100 may store data in one of the storage servers 1200 to 1200m via the network 1300 upon receiving a request from a user or a client to store the data. Further, the application server 1100 may acquire data from one of the storage servers 1200 to 1200m via the network 1300 upon receiving a request from a user or a client to read the data. For example, the application server 1100 may be implemented as a web server or Database Management System (DBMS).

The application server 1100 may access the memory 1120n or the storage device 1150n included in another application server 1100n via the network 1300. Alternatively, the application server 1100 may access memories 1220 and 1220m or the storage devices 1250 to 3250m included in the storage server 1200 to 1200m via the network 1300. Accordingly, the application server 1100 may perform various operations on data stored in the application servers 1100 to 1100n and/or the storage servers 1200 to 1200m. For example, the application server 1100 may execute instructions for moving or copying data between the application servers 1100 to 1100n and/or the storage servers 1200 to 1200m. At this time, data may flow from the storage devices 1250 to 1250m of the storage servers 1200 to 1200m through the memories 1220 to 1220m of the storage servers 1200 to 1200m to the memories 1120 to 1120n of the application servers 1100 to 1100n or may be directly delivered from the storage devices 1250 to 1250m to of the storage servers 1200 to 1200m to the memories 1120 to 1120n of the application servers 1100 to 1100n. The data flowing over the network 1300 may be encrypted data for security or privacy.

For example, the application server 1100 may include the ML model embedded device as described in FIGS. 1 through 12. The application server 1100 including the ML model embedded device may train an individual simulation model for each of storage servers 1200 to 1200m to apply the optimized parameter or the optimized workload that increases (e.g., maximizes) the QoS for each storage server. For example, the application server 1100 may train a first simulation model to calculate a first optimized parameter or a first optimized workload for the first storage server. The first storage server may operate under control of the first optimized parameter or the first optimized workload. The application server 1100 may train a second simulation model to calculate a second optimized parameter or a second optimized workload for the second storage server. The second storage server may operate under control of the second optimized parameter or the second optimized workload. According to various embodiments, the first simulation model and the second simulation model may be the same as or different from each other.

The storage server 1200 is described by way of example. An interface 1254 may provide a physical connection between the processor 1210 and a controller 1251 and a physical connection between an NIC 1240 and the controller 1251. For example, the interface 1254 may be implemented in a Direct Attached Storage (DAS) scheme in which the storage device 1250 is directly connected to a dedicated cable. Further, for example, the interface 1254 may be implemented in various interface schemes such as Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVMe, IEEE 1394, universal serial bus (USB), secure digital (SD) card, multi-media card (MMC), embedded multi-media card (eMMC), Universal Flash Storage (UFS), embedded Universal Flash Storage (eUFS), and compact flash (CF) card interface, etc.

The storage server 1200 may further include a switch 1230 and the NIC 1240. The switch 1230 may selectively connect the processor 1210 and the storage device 1250 to each other or selectively connect the NIC 1240 and the storage device 1250 to each other under control of the processor 1210.

In some embodiments, the NIC 1240 may include a network interface card, a network adapter, and the like. The NIC 1240 may be connected to the network 1300 via a wired interface, a wireless interface, a Bluetooth interface, or an optical interface. The NIC 1240 may include am internal memory, DSP, a host bus interface, etc., and may be connected to the processor 1210 and/or the switch 1230 via the host bus interface. The host bus interface may be implemented as one of the examples of the interface 1254 as described above. In some embodiments, the NIC 1240 may be integrated with at least one of the processor 1210, the switch 1230, and the storage device 1250.

In the storage servers 1200 to 1200*m* or the application servers 1100 to 1100*n*, the processor may transmit a command to the storage devices 1130 to 1130*n* and 1250 to 1250*m* or the memories 1120 to 1120*n* and 1220 to 1220*m* to program or read data thereto or therefrom. In this case, the data may be data error-corrected via the ECC engine. The data may be data subjected to Data Bus Inversion (DBI) or Data Masking (DM), and may include Cyclic Redundancy Code (CRC) information. The data may be encrypted data for security or privacy.

The storage devices 1150 to 1150*m* and 1250 to 1250*m* may transmit a control signal and a command/address signal to the NAND flash memory devices 1252 to 1252*m* in response to a read command received from the processor. Accordingly, when the data is read-out from the NAND flash memory devices 1252 to 1252*m*, a Read Enable (RE) signal may be input as a data output control signal to allow the data to be output to a DQ bus. Data Strobe (DQS) may be generated using the RE signal. The command and address signals may be latched into the page buffer according to a rising edge or a falling edge of the Write Enable (WE) signal.

The controller 1251 may control overall operations of the storage device 1250. In some embodiments, the controller 1251 may include Static Random Access Memory (SRAM). The controller 1251 may write data to the NAND flash 1252 in response to a write-in command. Alternatively, the controller 1251 may read-out data from the NAND flash 1252 in response to a read-out command. For example, the write-in command and/or the read-out command may be provided from the processor 1210 in the storage server 1200, the processor 1210*m* in another storage server 1200*m*, or the processor 1110 or 1110*n* in the application server 1100 or 1100*n*. A DRAM 1253 may temporarily store (buffer) therein data to be written to the NAND flash 1252 or data read-out from the NAND flash 1252. Further, the DRAM 1253 may store therein meta data. In this connection, the meta data may be user data or data generated by the controller 1251 to manage the NAND flash 1252. The storage device 1250 may include Secure Element (SE) for security or privacy.

Although the embodiments of the present disclosure have been described above with reference to the accompanying drawings, the present disclosure may not be limited to the embodiments and may be implemented in various different forms. Those of ordinary skill in the technical field to which the present disclosure belongs will be able to understand that the present disclosure may be implemented in other specific forms without changing the technical idea or essential features of the present disclosure. Therefore, it should be understood that the embodiments as described above are illustrative in all respects and are not restrictive.

What is claimed is:

1. A storage system comprising:
    a storage device comprising a plurality of non-volatile memory devices; and
    a storage controller configured to access the storage device, and to perform a workload based on a parameter,
    wherein the parameter is selected by a simulation model to increase a Quality of Service (QOS) for the workload,
    wherein the simulation model is contained on a machine-learning model embedded device connected to the storage system and configured to:
        perform a training workload using a training parameter to generate predicted QoS data based on an initial simulation model, wherein the storage controller is also configured to perform the training workload using the training parameter to calculate real QoS data;
        calculate a loss based on a comparison between the predicted QOS data and the real QoS data;
        train the initial simulation model to update the simulation model based on the loss;
        cluster the training parameter and the training workload based on the real QOS data to find features;
        label the training parameter and the training workload based on the features; and
        operate based on the labeled training parameter and the labeled training workload to generate the predicted QoS data.

2. The storage system of claim 1, wherein a second loss of the updated simulation model is smaller than the loss of the initial simulation model.

3. The storage system of claim 1, wherein the simulation model is configured to be trained to search for a workload for increasing the QoS using a fixed parameter.

4. The storage system of claim 1, wherein the simulation model is configured to be trained to search for a parameter for increasing the QoS while the workload is fixed.

5. The storage system of claim 1, wherein the storage system is connected to a Machine Learning (ML) model embedded device comprising the simulation model, wherein machine learning based training of the simulation model based on the loss is performed by the ML model embedded device, and wherein the storage controller is configured to operate using an optimized parameter, wherein the optimized parameter is calculated by the trained simulation model based on each workload.

6. The storage system of claim 5, wherein the ML model embedded device further comprises a machine learning table storing the optimized parameter calculated from the trained simulation model and mapped to each workload to increase the QoS, and wherein the storage controller receives the optimized parameter adaptively corresponding to a non-volatile memory device and the workload from the machine learning table.

7. The storage system of claim 5, wherein the storage controller comprises a map table generated by the ML model embedded device, wherein the storage controller is configured to: adaptively select the optimized parameter based on a non-volatile memory device and the workload from the map table, and apply the selected optimized parameter.

8. The storage system of claim 1, wherein the storage system comprises a plurality of simulation models respectively trained based on the plurality of non-volatile memory devices.

9. A storage system comprising:
a storage device comprising a plurality of non-volatile memory devices; and
a storage controller configured to access the storage device,
wherein the storage controller comprises:
a central processing unit (CPU) for controlling an operation of the storage device;
a non-volatile memory device storing a plurality of parameters for the operation; and
a map table for storing mapping results between the plurality of parameters and each workload for the operation, wherein the plurality of parameters stored in the map table comprise optimized parameters calculated by a simulation model, wherein the optimized parameters increase Quality of Service (QoS) for each workload based on a state of the non-volatile memory device,
wherein the simulation model is configured to be trained based on a loss calculated based on a real QoS data set and a predicted QoS data set, and
wherein the simulation model is contained on a machine-learning model embedded device connected to the storage system and configured to:
cluster a training parameter and a training workload based on the real QoS data set to find features, wherein the storage system performs the training workload using the training parameter to calculate the real QoS data set;
label the training parameter and the training workload based on the features; and
operate based on the labeled training parameter and the labeled training workload to generate the predicted QoS data set.

10. The storage system of claim 9, wherein the map table comprises:
a first map table for storing first optimized parameters related to each workload for a first non-volatile memory device; and a second map table for storing second optimized parameters related to each workload for a second non-volatile memory device.

11. The storage system of claim 9, wherein the storage controller is configured to perform the training workload using the training parameter on the non-volatile memory device to calculate the real QoS data set.

12. The storage system of claim 9, wherein the simulation model is configured to perform the training workload using the training parameter to generate the predicted QoS data set, and wherein the simulation model is configured to be trained to reduce the loss.

13. A storage system comprising:
a storage device comprising a plurality of non-volatile memory devices; and
a storage controller configured to access the storage device, and to perform a workload based on a parameter,
wherein the storage controller is configured to store a plurality of workloads and a plurality of parameters;
wherein the workload and the parameter comprises optimized data calculated in a machine-learning based simulation model for increasing Quality of Service (QOS), the machine-learning based simulation model being contained on a machine-learning model embedded device connected to the storage system,
wherein the machine-learning based simulation model is configured to:
compare predicted QoS data and real QoS data to obtain a loss, wherein a previously trained simulation model performs a training workload using a training parameter to calculate the predicted QoS data; and
update the previously trained simulation model to an updated simulation model, wherein a loss of the updated simulation model is smaller than a loss of the previously trained simulation model,
cluster the training parameter and the training workload based on the real QoS data to find features;
label the training parameter and the training workload based on the features; and
operate based on the labeled training parameter and the labeled training workload to generate the predicted QoS data.

14. The storage system of claim 13, wherein the machine-learning based simulation model is configured to be trained to search for workloads for increasing the QoS using a fixed parameter.

15. The storage system of claim 13, wherein the machine-learning based simulation model is configured to be trained to search for parameters for increasing the QOS while the workload is fixed.

16. The storage system of claim 13, wherein the storage controller is configured to:
apply first optimized data selected based on features of a first non-volatile memory device to perform an operation on the first non-volatile memory device; and
apply second optimized data selected based on features of a second non-volatile memory device to perform an operation on the second non-volatile memory device.

17. The storage system of claim 13, wherein the Machine Learning (ML) model embedded device is configured to train the machine-learning based simulation model, wherein the ML model embedded device comprises a machine learning table mapping an optimized parameter to each workload by the machine-learning based simulation model, and wherein the ML model embedded device is configured to:
select, from the machine learning table, a parameter related to each workload to increase the QoS for a non-volatile memory device, and
transmit the selected parameter to the storage controller.

* * * * *